June 4, 1963
C. J. DAVIS
3,091,975
TWO SPEED TRANSMISSION
Filed Oct. 26, 1960
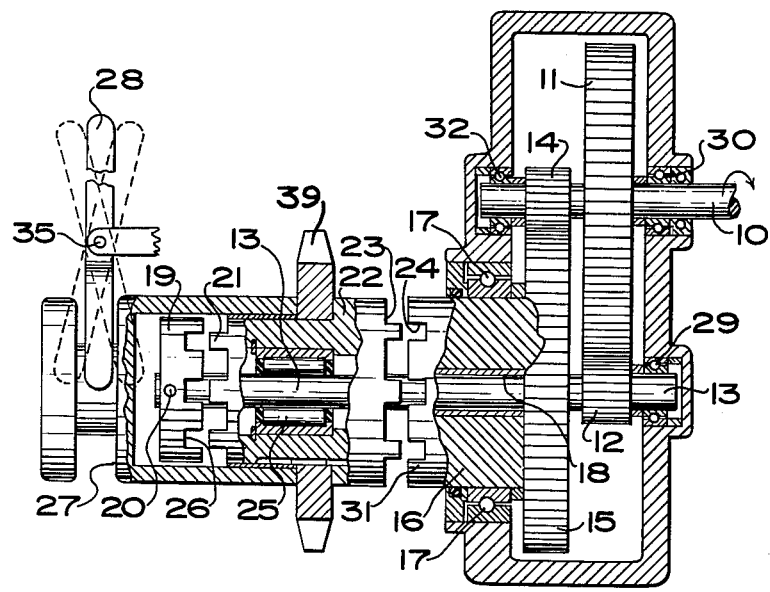
CHARLES J. DAVIS
*INVENTOR.*
BY *Hubert Miller*
ATTORNEY United States Patent Office 3,091,975
Patented June 4, 1963

3,091,975
TWO SPEED TRANSMISSION
Charles J. Davis, Wichita, Kans., assignor to Davis Manufacturing, Inc., Wichita, Kans., a corporation of Kansas
Filed Oct. 26, 1960, Ser. No. 65,025
2 Claims. (Cl. 74—330)

This invention relates to a change speed gearing and more particularly it relates to a single speed gear type transmission with a two speed dog type clutch.

It is an object of the present invention to provide a two speed clutch that is simple and economical to manufacture. It is another object of my invention to provide a two speed clutch that is rugged. Yet another object of this invention is to provide a clutch whereby it is possible to obtain two speeds from a gear type continuously meshed transmission. Other objects and advantages of the invention will appear as the description proceeds.

To the accomplishment of the foregoing and related ends, the invention, then, comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

The single FIGURE of the drawing is a side elevation partly in section of the two speed clutch constructed in accordance to the present invention.

Broadly stated, my two speed clutch comprises a driving shaft and two coaxial driven shafts which rotate at different speeds. Each of these driven shafts is fitted with a torque transmitting member which in turn is provided with jaw-clutch teeth. A slidable jaw clutch member is positioned between the two torque transmitting members and is provided with jaw-clutch teeth on its opposite faces to selectively engage the complementary teeth on the torque transmitting members.

Referring now to the drawing, the power driven shaft is denoted by the numeral 10 to which is securely attached gear wheels 11 and 14. As illustrated, gear 11 is large and gear 14 is small. The teeth of gear 12 meshing with the teeth of gear 11 cause shaft 13 to rotate when shaft 10 rotates. Simultaneously the rotation of small gear 14 causes the rotation of large gear 15 which is securely attached to sleeve shaft 16. Obviously, if desired, the sizes of the various gears 11, 12, 14 and 15 may be varied widely from the sizes illustrated. For example, gears 11 and 15 could be small and gears 12 and 14 large. From the preferred embodiment of the invention, as illustrated, shaft 13 will be rotated at a much higher speed than sleeve shaft 16. Shaft 10 is journalled at one end in bearings 30 and 32 within a transmission casing. Sleeve shaft 16 is journalled in bearing 17 and shaft 16 in turn serves as a journal box for shaft 13 by means of the central concentric bushing 18. Bearing 25 also serves as a journal box for shaft 13. Sleeve shaft 16 terminates in torque transmitting member or clutch half 31 the surface of which (facing away from gear 15) is notched as indicated by the numeral 24. On the outer end thereof, shaft 13 is fitted with torque transmitting member or clutch half 19 which is securely attached thereto by means of the pin 20. The surface of this clutch half, facing gears 15 and 12, is also notched as indicated by the numeral 26. Slidable clutch member 22, supported on shaft 13 by means of the bearing 25, is adapted to rotate and slide longitudinally freely thereon. The opposite ends of clutch member 22 are also notched as indicated by the numerals 21 and 23, and are engageable respectively with notches 26 and 24 as clutch member 22 is moved in either direction from the neutral position which it occupies in the drawing. For strength and ruggedness, the notches on the engaging faces of the various clutch members are preferably in the form of teeth as illustrated in the drawing.

The slidable clutch member 22 has an annular shifter fork groove 27 formed in its outer end. The movement of member 22 is controlled by means of a shift fork lever 28, pivoted on a fixed pivot 35. Numeral 39 indicates a power take-off member, such as a sprocket. Obviously a pulley, gear wheel, or other mechanical equivalent could be substituted therefor if desired.

The drive shaft 10 of the gearing illustrated in the drawing may be connected through a main clutch to a power source, not shown. This main clutch is conveniently any conventional clutch such as a hydraulic coupling or other standard type of coupling.

As an aid to the further understanding of the invention it will be apparent as the power input shaft 10 is rotated, large gear 11 and small gear 12 will rotate shaft 13. For illustrative purposes only, it will be assumed that shaft 13 rotates at a speed of 400 r.p.m. Simultaneously, small gear 14 and large gear 15 will rotate sleeve shaft 16 in the same direction. Due to the gear ratios involved, sleeve shaft 16 will rotate at about 40 r.p.m.

It will be seen that if clutch part 22 is shifted to the left and engages clutch half 19 it will then be rotated at the speed of shaft 13 (400 r.p.m.). Alternatively, if clutch part 22 is shifted to the right along shaft 13, its adjacent face will engage sleeve shaft 16 and the sprocket 39 and the clutch part 22 which carries the sprocket will be rotated at the speed of sleeve shaft 16. Shaft 13 will simultaneously be rotated at a considerably higher speed within the sleeve shaft 16 and within the clutch part 22.

Other modes of applying the principle of the invention may be employed, change being made as regards the details described, provided the features stated in any of the following claims, or the equivalent of such, be employed.

I, therefore, particularly point out and distinctly claim as my invention:

1. A two speed transmission provided with a casing and including a driving shaft member therein and fitted with two gear wheels of different diameters; first and second driven shafts telescoped one within another, each being fitted with a gear wheel of a different diameter, each last mentioned gear wheel being meshed with a respective gear wheel on said driving shaft member, whereby said driven shafts rotate at different speeds; said first and second shafts projecting externally from said casing in a common direction beyond the plane of said gear wheels and with the projecting end of the inner one of the shafts extending beyond the corresponding end of the outer shaft; a first torque transmitting member rotatable with the first driven shaft; a second torque transmitting member rotatable with the second driven shaft, each of said torque transmitting members having jaw clutch teeth; an externally disposed generally annular clutch member mounted in an exposed position on said projecting end of the inner shaft and adapted for axial movement on said shaft between positions beyond the corresponding end of the outer shaft and for independent rotational movement about that axis, said clutch member having jaw clutch teeth engageable selectively with the jaw clutch teeth on said first torque transmitting member and with the jaw clutch teeth on said second torque transmitting member; and an annular power take-off member mounted in surrounding relation to and being fast to said clutch member and a hollow, generally cylindrical clutch housing member carried by and movable with said annular clutch member and enclosing the projecting end of the inner shaft and the clutch teeth carried thereby as well as the clutch teeth on the annular clutch member disposed for cooperation therewith, and means for shifting the clutch member axially of said inner shaft in opposite directions for selectively and operatively engaging the jaw clutch teeth carried by said first and second shafts respectively, said last-mentioned means including an operator operated lever operatively engaged with said cylindrical clutch housing and operative to move the same axially of the inner shaft.

2. A two speed transmission provided with a casing and including a driving shaft member therein and fitted with two gear wheels of different diameters; first and second driven shafts telescoped one within another, each being fitted with a gear wheel of a different diameter, each last mentioned gear wheel being meshed with a different one of the gear wheels on the driving shaft member, whereby the inner one of the shafts is a fast running shaft and the outer shaft is a relatively slow shaft; first and second torque transmitting members rotatable with the respective first and second driven shafts, each of said torque transmitting members having jaw clutch teeth; said first and second shafts projecting externally from said transmission casing in a common direction beyond the plane of said gear wheels and with the projecting end of the fast inner shaft extending beyond the corresponding end of the slow outer shaft; an externally disposed, generally annular clutch member mounted in an exposed position on the projecting end of the fast inner shaft and adapted for axial movement thereon in positions beyond the corresponding end of the outer shaft and for independent rotational movement about that axis, said clutch member having jaw clutch teeth at opposite ends thereof respectively engageable selectively with the jaw clutch teeth on said first torque transmitting member and with the jaw clutch teeth on said second torque transmitting member; a generally cylindrical hollow clutch housing member carried by said annular clutch member and having a closed outer end portion enclosing the projecting end of said fast inner shaft, the jaw clutch teeth carried thereby and the opposed teeth on the annular clutch member cooperating therewith, said clutch housing member being axially movable with said annular clutch member; an annular power take-off member mounted in surrounding relation to and fast to said clutch member and carrying an external set of sprocket means thereon; said cylindrical clutch housing member being provided with annular clutch shifting means adjacent to the closed outer end thereof, and an operator operated clutch shift lever means engageable with said annular means on said axially movable clutch housing member and operable to shift the annular clutch member axially of said inner shaft in opposite directions to operatively engage the same selectively with the jaw clutch teeth of said first and second driven shafts for causing said transmission to drive the power take-off member selectively at said fast shaft running speed and at said slow shaft running speed.

References Cited in the file of this patent
UNITED STATES PATENTS

| | | |
|---|---|---|
| 1,227,298 | Neighbour | May 22, 1917 |
| 2,602,898 | Inghram et al. | July 8, 1952 |